(12) United States Patent
Chantry

(10) Patent No.: US 11,449,609 B2
(45) Date of Patent: Sep. 20, 2022

(54) DETECTING OBFUSCATED MALWARE VARIANTS

(71) Applicant: Sophos Limited, Abingdon (GB)

(72) Inventor: Graham John William Chantry, Abingdon (GB)

(73) Assignee: Sophos Limited, Abingdon (GB)

( * ) Notice: Subject to any disclaimer, the term of this patent is extended or adjusted under 35 U.S.C. 154(b) by 344 days.

(21) Appl. No.: 16/254,462

(22) Filed: Jan. 22, 2019

(65) Prior Publication Data

US 2020/0233962 A1 Jul. 23, 2020

(51) Int. Cl.
*G06F 21/56* (2013.01)
*G06F 8/30* (2018.01)

(52) U.S. Cl.
CPC ........... *G06F 21/566* (2013.01); *G06F 8/311* (2013.01); *G06F 21/562* (2013.01); *G06F 2221/033* (2013.01)

(58) Field of Classification Search
CPC ....... G06F 21/56–568; G06F 2221/033; G06F 8/311; H04L 63/14–145
See application file for complete search history.

(56) References Cited

U.S. PATENT DOCUMENTS

| | | | |
|---|---|---|---|
| 7,266,844 B2 | 9/2007 | Teblyashkin et al. | |
| 7,624,449 B1 | 11/2009 | Perriot | |
| 7,636,945 B2 | 12/2009 | Chandnani et al. | |
| 9,087,195 B2* | 7/2015 | Golovkin | G06F 21/563 |
| 2005/0108697 A1* | 5/2005 | Ogasawara | G06F 8/443 |
| | | | 717/110 |
| 2006/0294503 A1* | 12/2006 | Henderson | G06F 11/3604 |
| | | | 717/131 |
| 2008/0178149 A1* | 7/2008 | Peterson | G06F 8/437 |
| | | | 717/110 |
| 2015/0033339 A1 | 1/2015 | Geffner | |

OTHER PUBLICATIONS

B. Yadegari, B. Johannesmeyer, B. Whitely and S. Debray, "A Generic Approach to Automatic Deobfuscation of Executable Code," 2015 IEEE Symposium on Security and Privacy, 2015, pp. 674-691, doi: 10.1109/SP.2015.47. (Year: 2015).*

(Continued)

*Primary Examiner* — Madhuri R Herzog
(74) *Attorney, Agent, or Firm* — Strategic Patents, P.C.

(57) ABSTRACT

A threat management facility analyzes a plurality of instructions in computer code for redundancy. When redundancy is found, the threat management facility determines whether the redundancy has characteristics of deliberate obfuscation consistent with malware techniques such as server-side polymorphism. Measures of redundancy, such as one or more of a degree of redundancy or a pattern of redundancy, may inform this process, and my usefully aid in distinguishing legitimate code redundancies from malware. Where an inference of malware is supported, the threat management facility may initiate remediation of the computer code. Further, or instead, the type of remediation applied to the computer code may be based on one or more aspects of the detected obfuscation.

18 Claims, 8 Drawing Sheets

(56) References Cited

OTHER PUBLICATIONS

Bruschi, Danilo, Lorenzo Martignoni, and Mattia Monga. "Using code normalization for fighting self-mutating malware." Proceedings of the International Symposium on Secure Software Engineering. 2006. (Year: 2006).*
IPO, "UK Application Serial No. 2000639.1 Search and Examination Report dated Jun. 24, 2020", 9 pages.
IPO, "UK Application No. 2000639.1 Examination Report dated Jul. 1, 2021", 3 pages.
IPO, "UK Application No. 2000639.1 Examination Report dated Feb. 7, 2022", 4 pages.
IPO, "UK Application No. 2000639.1 Examination Report dated May 25, 2022", 3 pages.

* cited by examiner

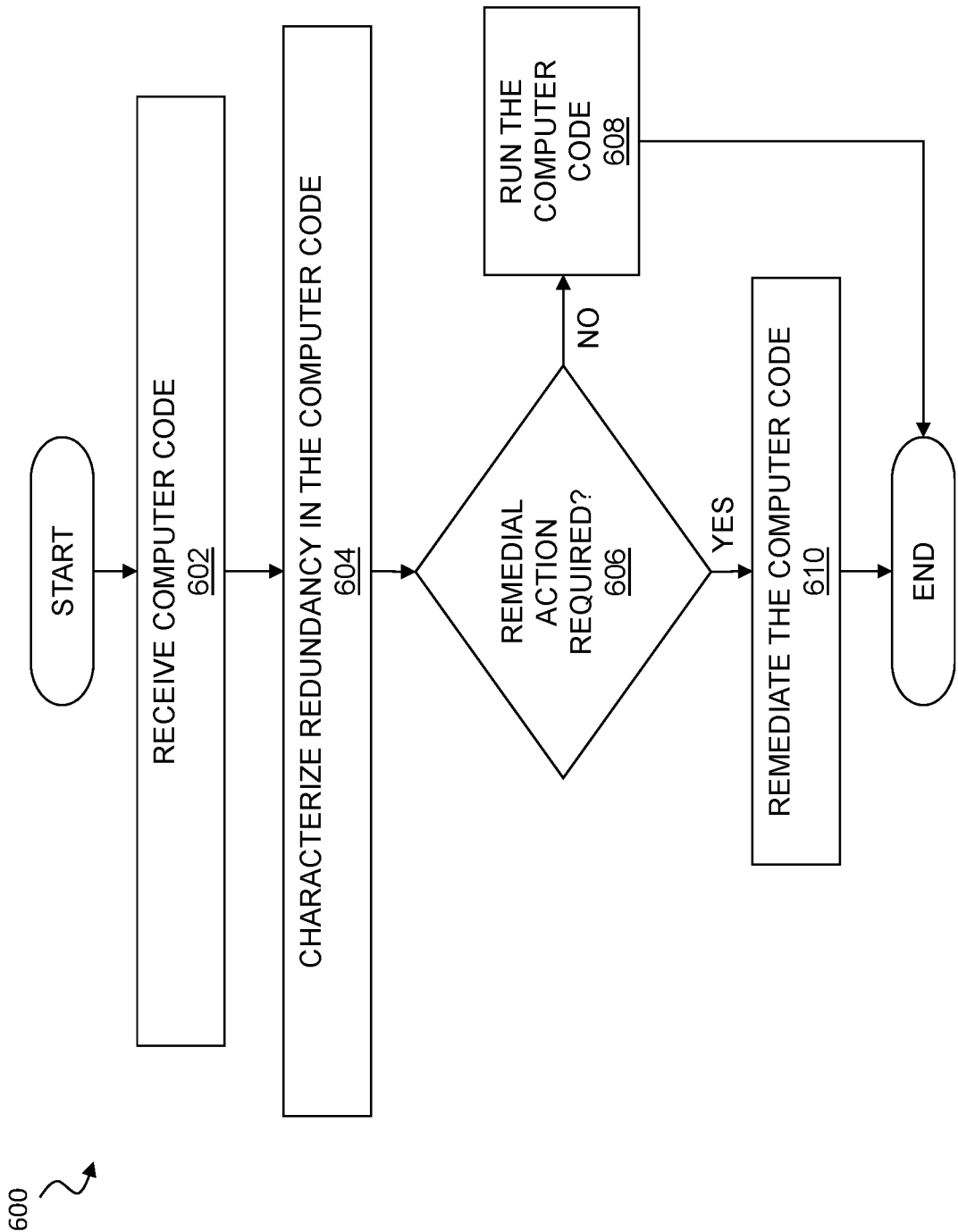

DETECTING OBFUSCATED MALWARE VARIANTS

FIELD

The present disclosure generally relates to malware detection and, more specifically, to detecting obfuscated variants of malware.

BACKGROUND

Malware is a common and persistent threat to computing devices and, in some cases, to entire computing networks. Although some variants of malware can be detected through pattern matching or identification of known strings in the malware code, the effectiveness of such matching techniques generally depends on signatures or other information within a threat management database. To elude detection, therefore, malware distribution may make use of server-side polymorphism to generate obfuscated variants of malware for distribution to client-side devices. These obfuscated variants may resemble non-threatening code and, when formed in large numbers, can be challenging to detect through systematic techniques. As a result, the use of server-side polymorphism poses substantial challenges to matching or signature-based techniques.

There remains a need for improved malware detection suitable for addressing server-side polymorphism and other code obfuscation techniques.

SUMMARY

A threat management facility analyzes a plurality of instructions in computer code for redundancy. When redundancy is found, the threat management facility determines whether the redundancy has characteristics of deliberate obfuscation consistent with malware techniques such as server-side polymorphism. Measures of redundancy, such as one or more of a degree of redundancy or a pattern of redundancy, may inform this process, and may usefully aid in distinguishing legitimate code from malware. Where an inference of malware is supported, the threat management facility may initiate remediation of the computer code. Further, or instead, the type of remediation applied to the computer code may be based on one or more aspects of the detected obfuscation.

According to one aspect, a computer program product for detecting malware may include computer executable code embodied in a non-transitory computer readable medium that, when executing on one or more computing devices, performs the steps of receiving a script language code at a threat management facility in communication with an endpoint, the script language code including a plurality of expressions processable by an application in a run-time environment on the endpoint, tokenizing the plurality of expressions of the script language code into computing objects, compressing the computing objects into a compressed script in which redundancy is decreased relative to the script language code by removing one or more expressions from the script language code while maintaining functionality of the script language code, determining a degree of redundancy in the script language code based on a difference between the script language code and the compressed script, and conditionally initiating a remedial action responsive to the script language code when the degree of redundancy exceeds a predetermined threshold.

In certain implementations, the script language code may include at least one of Visual Basic for Applications (VBA) or JavaScript.

In some implementations, the difference between the script language code and the compressed script may be characteristic of polymorphism.

In certain implementations, the difference between the script language code and the compressed script may be characteristic of obfuscation.

According to another aspect, a method of detecting malware may include receiving computer code, the computer code including a code segment executable by an endpoint, characterizing redundancy in the code segment, and in response to characterizing the redundancy, permitting or denying execution of the computer code by the endpoint.

In certain implementations, the redundancy may be characteristic of polymorphism. Additionally, or alternatively, the redundancy may be characteristic of obfuscation. In some instances, the redundancy may include at least one of superfluous variables, superfluous function calls, superfluous structure, or superfluous flow control.

In some implementations, characterizing the redundancy may include identifying a type of redundancy. Further, or instead, characterizing the redundancy may include comparing the computer code to a compressed version of the computer code, the compressed version of the computer code having decreased redundancy, as compared to the computer code, while maintaining functionality of the computer code.

In certain implementations, the computer code may include a scripting language interpretable by an application executing on the endpoint. Additionally, or alternatively, the computer code may include at least one of list-based code, structured code, object-oriented code, and aspect-oriented code.

In some implementations, receiving computer code may include receiving the computer code at a security agent executing on the endpoint. Additionally, or alternatively, receiving computer code may include receiving the computer code at a threat management facility for an enterprise network containing the endpoint. For example, permitting or denying execution of the computer code includes presenting an acceptance decision to an administrator through a user interface at the threat management facility.

In certain implementations, the code segment may include at least one of a script language, interpreted code, source code, or compiled code. Additionally, or alternatively, the code segment may include at least one of an expression and a statement.

In some implementations, the code segment may be executable by an application on the endpoint, and the application is one or more of a word processing application, a spreadsheet, a portable document application, or an electronic mail client.

In certain implementations, the computer code may be received at a security agent on the endpoint via one or more of a data network in communication with the endpoint or via a USB device accessible from the endpoint.

In some implementations, characterizing redundancy in the code segment may include identifying one or more subroutines in the code segment for which all results are known without external input. The one or more subroutines in the code segment may, for example, correspond to procedures that are split up.

In some implementations, the code segment may include a conditional statement lacking a condition. Additionally, or alternatively, the code segment may include one or more variables unnecessary for execution of the computer code.

In certain implementations, characterizing redundancy may be based only on identifiable portions of the code segment. For example, identifiable portions of the code segment may be unencrypted.

In some implementations, characterizing redundancy in the code segment may include determining a degree of redundancy in the code segment. For example, permitting or denying execution of the computer code by the endpoint is based on comparing the degree of redundancy to a predetermined threshold. As a specific example, the predetermined threshold may be greater than about 25 percent and less than about 95 percent. Additionally, or alternatively, the predetermined threshold may be adjustable by an administrator through a user interface at a threat management facility in communication with the endpoint.

In certain implementations, permitting or denying execution of the computer code may be based on a combination of at least one behavior of the computer code and the degree of redundancy. For example, the at least one behavior may include at least one of an auto open behavior or an attempt to access a resource external to the endpoint.

According to yet another aspect, a system may include an endpoint including a memory and a processor, the memory having stored therein an application with which computer code is executable, and a threat management facility in a communicating relationship with the endpoint, the threat management facility configured to receive the computer code intended for execution by the application stored in the memory of the endpoint, to determine a degree of redundancy in a code segment included in the computer code, and, based on the degree of redundancy, to permit or deny execution of the computer code by the application stored in the memory of the endpoint.

According to still another aspect, a method of evaluating a computer code for execution on an endpoint may include receiving the computer code at a threat management facility in communication with the endpoint, the computer code including a plurality of expressions processable in a runtime environment on the endpoint, tokenizing the plurality of expressions into computing objects, compressing the computing objects to reduce redundancy in the computing objects while maintaining functionality of the computer code, based on compression of the computing objects, determining a pattern of redundancy of the plurality of expressions in the computer code, comparing the pattern of redundancy to one or more known patterns of redundancy associated with malware, based on similarity between the pattern of redundancy and the one or more known patterns of redundancy, assigning a reputation to the computer code, and remediating the computer code based on the reputation.

According to still another aspect, a method of evaluating computer code for execution on an endpoint may include receiving the computer code, the computer code including a plurality of expressions evaluable by an application on the endpoint, determining a pattern of redundancy in the plurality of expressions, comparing the pattern of redundancy to one or more known patterns of redundancy associated with malware, based on similarity between the pattern of redundancy and the one or more known patterns of redundancy, assigning a reputation to the computer code, and remediating the computer code based on the reputation.

In certain implementations, the plurality of expressions may correspond to one or more of compiled code or a script language. Further, or instead, the application may be one or more of a word processing application or a spreadsheet application on the endpoint.

In some implementations, the computer code may be received at a security agent on the endpoint via one or more of a data network in communication with the endpoint or a USB device accessible from the endpoint. Additionally, or alternatively, the computer code may be received at a threat management facility remote from the endpoint.

In certain implementations, determining the pattern of redundancy in the plurality of expressions may include identifying one or more subroutines in the computer code for which all results are known without external input. The pattern of redundancy in the plurality of expressions may correspond, for example, to one or more subroutines in the computer code that are split up. Additionally, or alternatively, the pattern of redundancy in the plurality of expressions may include a conditional statement lacking a condition. Further, or instead, the pattern of redundancy in the plurality of expressions may include one or more variables unnecessary for execution of the computer code.

In some implementations, the plurality of expressions may include identifiable portions and unidentifiable portions, and determining the pattern of redundancy may include identifying interaction between the identifiable portions and the unidentifiable portions. For example, the identifiable portions of the plurality of expressions are unencrypted and the unidentifiable portions of the plurality of expressions may be encrypted.

In some implementations, assigning the reputation of the computer code may be based on a combination of the pattern of redundancy in the plurality of expressions and one or more behaviors of the computer code. As an example, the one or more behaviors include at least one of an auto open behavior or an attempt to access a resource external to the endpoint.

In certain implementations, remediating the computer code based on the reputation may include presenting a remediation decision to an administrator through a user interface at a threat management facility remote from the endpoint. Further, or instead, remediating the computer code may include running the computer code in a sandbox environment. Additionally, or alternatively, remediating the computer code based on the reputation may include limiting access of the endpoint to network resources. Further, or instead, remediating the computer code may include restricting access by the computer code to resources external to the endpoint. Still further or instead, remediating the computer code may include restricting access by the computer code to encrypted files on the endpoint.

According to yet another aspect, a system may include an endpoint including a memory and a processor, the memory having stored therein an application with which computer code is executable, and a threat management facility in a communicating relationship with the endpoint, the threat management facility configured to receive the computer code intended for execution by the application stored in the memory of the endpoint, to determine a pattern of redundancy in a plurality of expressions in the computer code, to compare the pattern of redundancy to one or more known patterns of redundancy associated with malware, to assign a reputation to the computer code based on similarity between the pattern of redundancy and the one or more known patterns of redundancy, and to remediate the computer code based on the reputation.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 6 is a flowchart of an exemplary method of detecting malware.

DETAILED DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," and the like, are words of convenience and are not to be construed as limiting terms.

Figure 1:
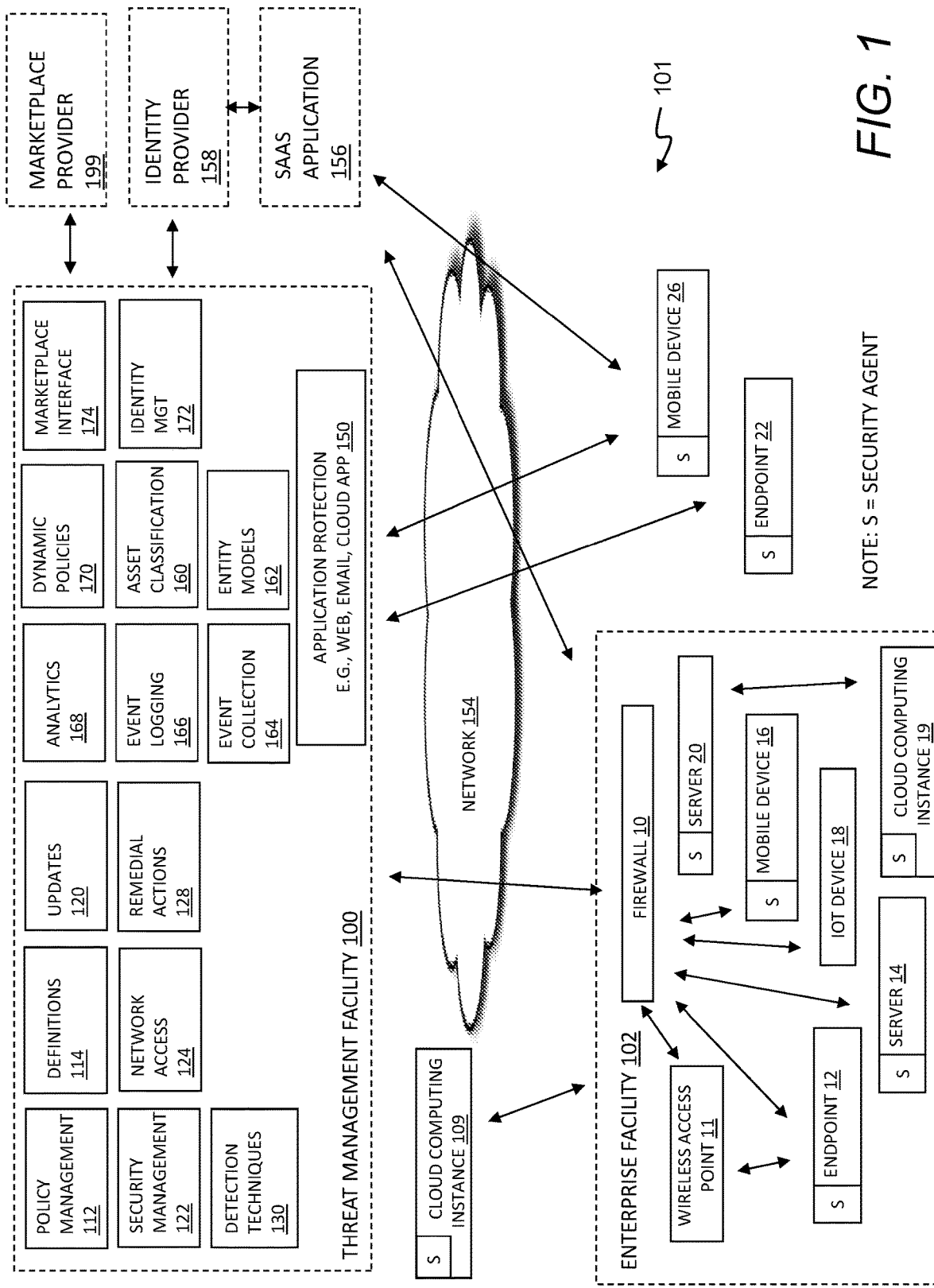
FIG. 1 depicts a block diagram of a threat management system.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or TOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

In embodiments, aspects of the threat management facility 100 may be provided as a stand-alone solution. In other embodiments, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the security management facility 122 may take any steps or deploy any measures suitable for addressing a detection of a threat, potential threat, policy violation or other event, code or activity that might compromise security of a computing instance 10-26 or the enterprise facility 102.

Figure 2:
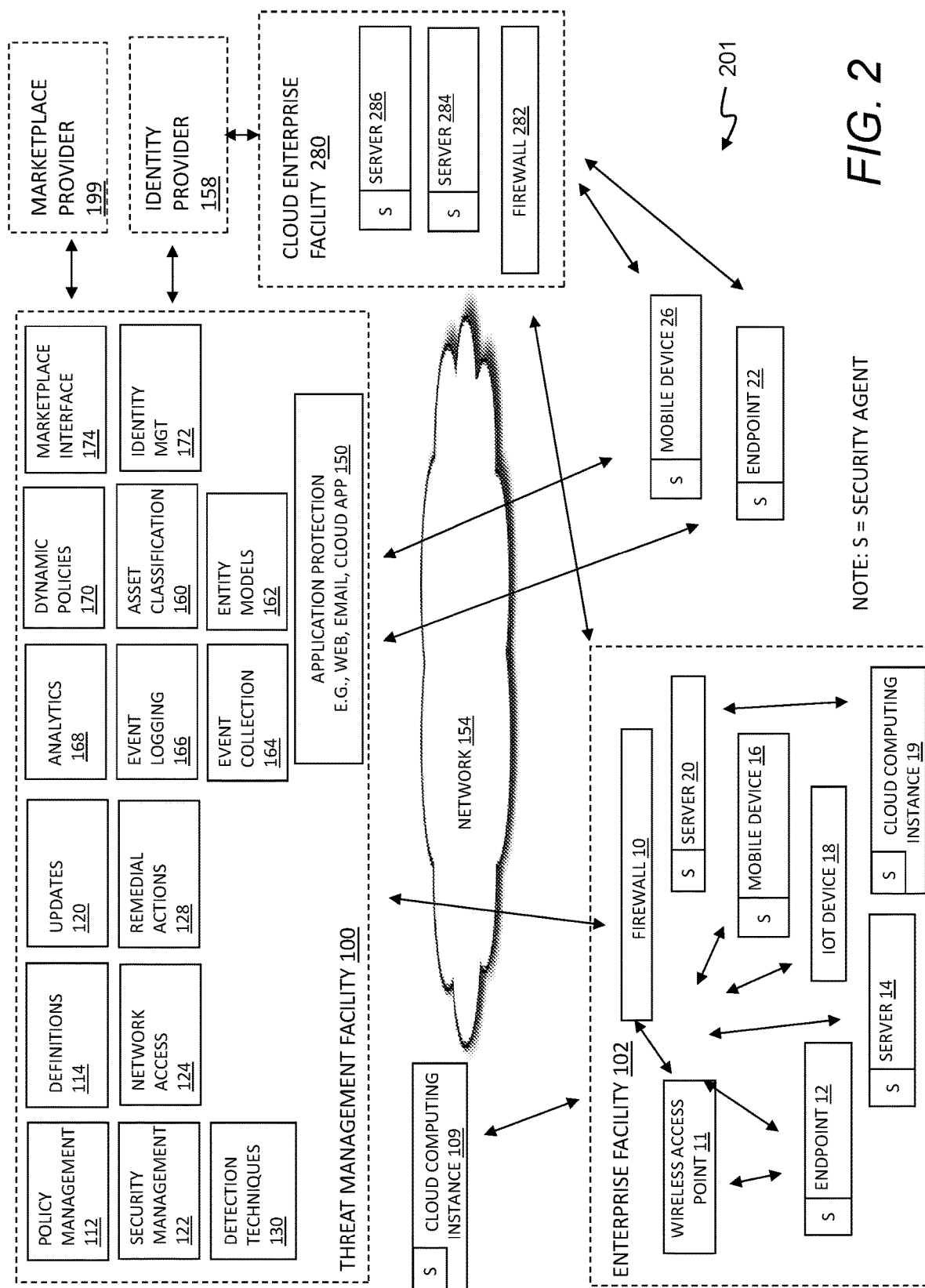
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
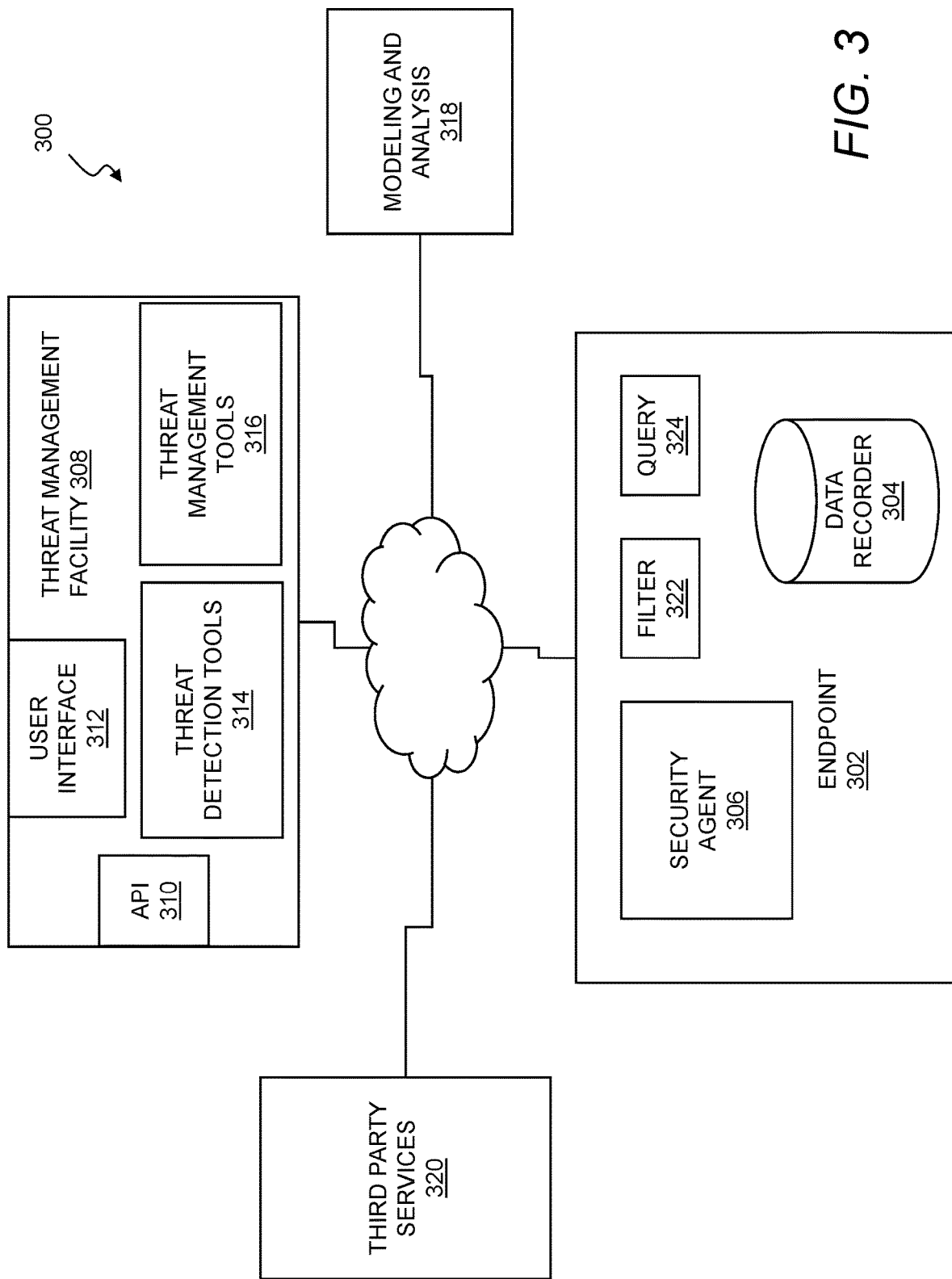
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a web site or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature-based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty-eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
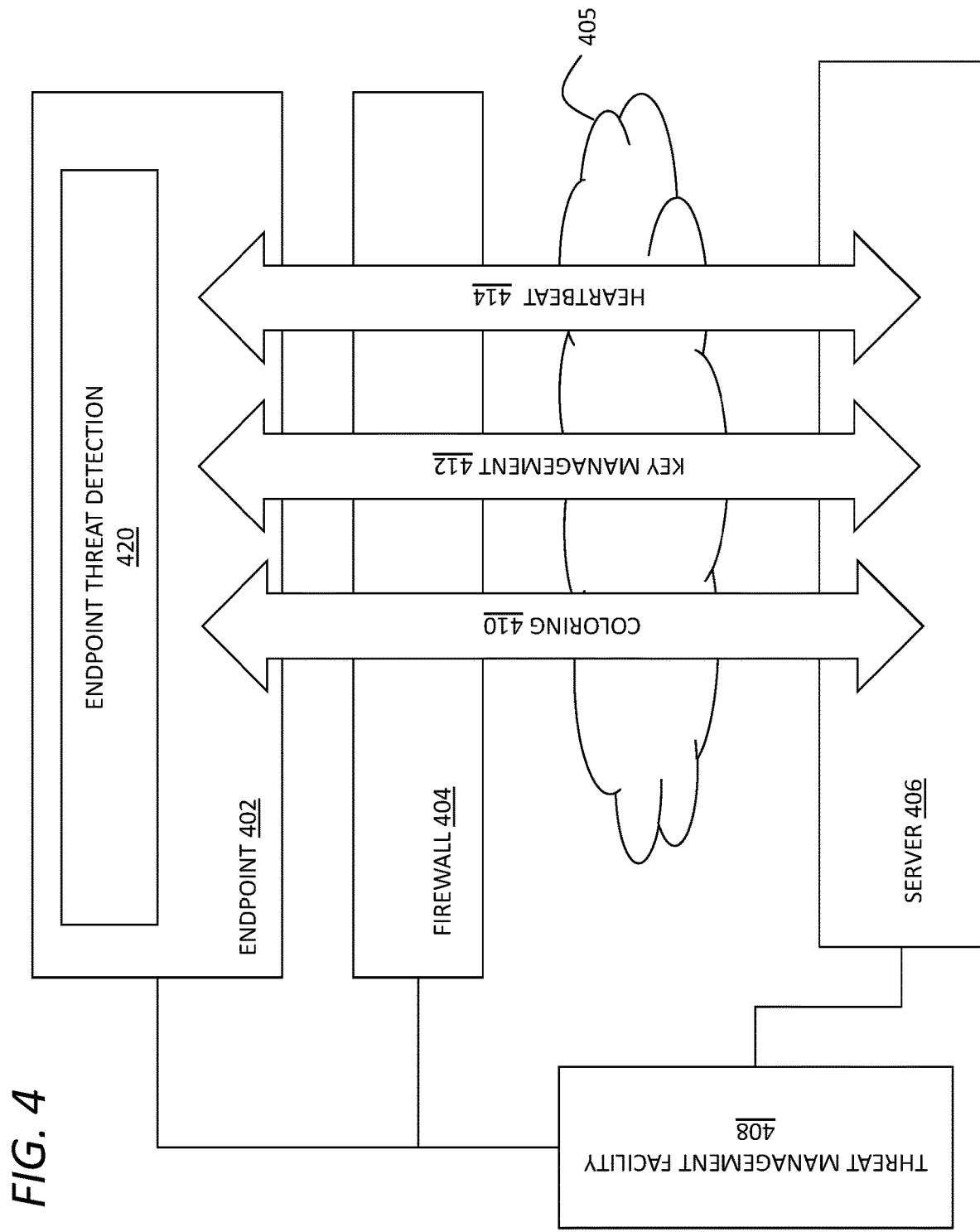
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process, or from a user that launches the application. Similarly, a file may inherit a color from a process when it is created or opened by a process, and/or a process may inherit a color from a file that the process has opened. A user may inherit a color from a process or from a file accessed by the user. More generally, any type of labeling, as well as rules for propagating, inheriting, changing, or otherwise manipulating such labels, may be used by the coloring system 410 as contemplated herein. A request for or access of obfuscated computer code may be used by the coloring system 410 to indicate, for example, that a device, process, application, file, user, etc. has requested or accessed software identified as or suspected of being malware. As a more specific example, the color may indicate that the device, process, application, file, or user is suspicious or compromised based on interaction of the device, process, application, file, or user with computer code characterized by a particular degree, pattern, or other indicia, of obfuscation. As described in greater detail below, code executable by an application on the endpoint 402 may be assessed for redundancy and, given that one or more of a degree or a pattern of redundancy may be characteristic of malware, the redundancy in computer code may form a basis for identifying software as malware or suspected malware. In certain instances, a degree, a pattern, or combination thereof, of redundancy in the code may form a basis of a color applied to the code by the coloring system 410. For example, the coloring system 410 may color the code with a reputation based on the degree of redundancy and/or based on a detected pattern of redundancy.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule. As an example, the heartbeat system 414 may be used to notify an endpoint 402 that a request for malware has been made, and to direct the endpoint 402 to take remedial action. For example, the heartbeat system 414 may be used to notify a server 406 that a device, application, process, file, or user that has requested malware is compromised, and to limit access to that user.

Having provided an overall context for threat detection and computer systems, the description now turns to techniques of detecting obfuscation in computer code. While detected obfuscation in computer code may be not harmful per se, there are few legitimate reasons for large degrees of obfuscation in computer code. This is particularly true in contexts, such as scripting languages, in which inefficient coding associated with obfuscation is both more difficult to create and is not associated with an improvement in performance of the computer code. Accordingly, the presence of obfuscation may be highly probative of whether computer code is malware. Making beneficial use of this insight, the techniques described herein are based on using one or more assessments of obfuscation as at least an initial filter for whether a particular computer code is malware or suspected of being malware. Advantageously, this approach does not require predetermined knowledge of any particular variant of malware, making it a robust countermeasure against circumvention techniques used to deliver malware. That is, the use of obfuscation as a basis for assessing whether computer code is malware or suspected malware may be useful against both known and unknown variants of malware and, as such, may render server-side polymorphism less effective for distributing malware.

Unless otherwise specified or made clear from the context, the techniques of detecting obfuscated computer code described herein may be implemented by any one or more of the devices and systems described herein. Thus, for example, any one or more aspects of the techniques of detecting malware described below may be implemented by a system 300 (FIG. 3) including at least one endpoint 302 (FIG. 3) and a threat management facility 308 (FIG. 3). In certain implementations, each of the at least one endpoint 302 (FIG. 3) may include a processor and a memory, the memory having stored thereon an application on which computer code is executable. Additionally, or alternatively, the threat management facility 308 (FIG. 3) may be in a communicating relationship with each of the at least one endpoint 302 and configured to carry out any of various different aspects of the techniques of detecting malware described below.

Figure 5A:
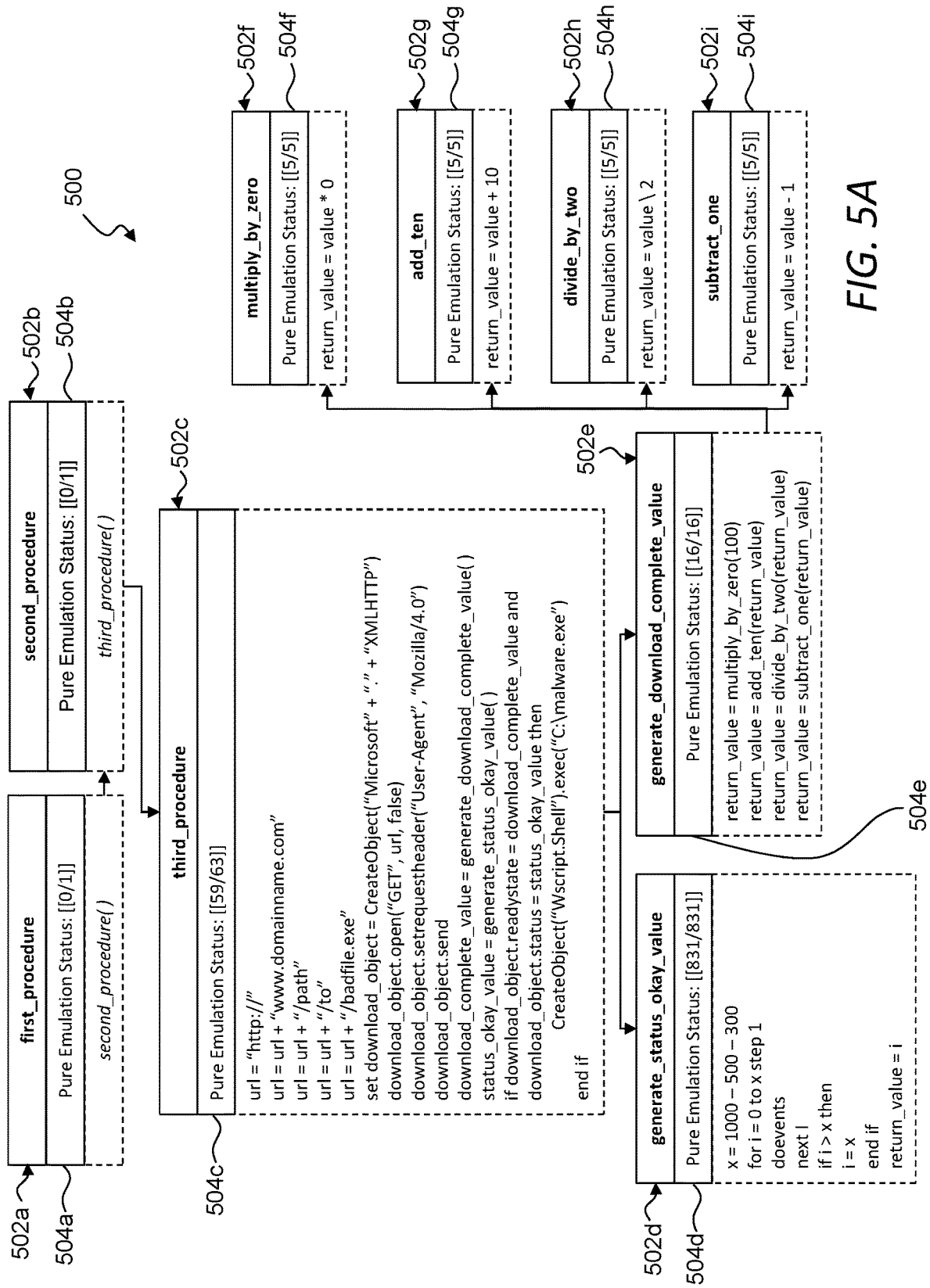
FIG. 5A is a schematic representation of tokenization of computer code.

FIG. 5A is a schematic representation of tokenization of computer code 500. As used herein, tokenization may generally include forming the computer code 500 into one or more of various different computing objects 502a-502i or other abstracted, simplified, or otherwise converted statements, functions, routines or the like having predetermined meanings. For example, tokenization may include scanning the computer code 500 and, based at least in part on the scan, splitting the computer code 500 into strings. Continuing with this example, these strings may be syntactically parsed (e.g., with a lexical analysis) into the computing objects 502a-502i, representing executable elements of a program. For example, the computing objects 502a-50si may include functions, parameters, operators, data structures, methods, or other concepts related to representing state and behavior. As described in greater detail below, redundant code may include, for example, statements, expressions, variables for which all results are known, invariant, or both, upon execution. Redundant code may also or instead include any code that returns a fixed, predetermined result independent of other program operations, or that executes instructions or performs functions that do not affect, for example, other program variables or flow control. More generally, redundant code may include any code that is removable or compressible without affecting other inputs, outputs, functions or external (to the code) behaviors during execution. In certain instances, redundant code may be superfluous, such that the code can be eliminated completely without changing the output of the computing objects 502a-502i. Additionally, or alternatively, redundant code may be combined with other code without changing the behavior or output of the computing objects 502a-502i.

In general, the computer code 500 may be any of various different types of software subject to obfuscation and, thus, able to deliver a malware threat. However, for the sake of clarity of explanation, the computer code 500 is described in the context of a specific example using script language code including expressions executable by an application executing in a run-time environment on any one or more of the endpoints described herein. Further, it should be appreciated that the specific expressions in the computer code 500 are set forth for the sake of presenting an illustrative example and should not be considered limiting. Thus, the computer code 500 is not necessarily limited to the arrangement and number of the computing objects 502a-502i and, more generally, may include any one or more computing objects determined through tokenization of any manner and form of expressions that may appear in malware. Still further, while scripting languages used to create a script language code, such as Visual Basic for Applications (VBA), are a common source of obfuscated malware and, thus, represent a particularly relevant application for malware detection techniques described herein, it should be appreciated that the computer code 500 may further or instead include byte code, compiled code, or any other form of source code, executable code, or interpretable code, unless otherwise indicated or made clear from the context.

The computing object 502a is a first procedure ("first_procedure") that immediately calls the computing object 502b, which is a second procedure ("second_procedure"). Because the computing object 502a includes a call to the computing object 502b, the result of the computing object 502a is unknown. Further, because the computing object 502a includes only a call to the computing object 502b, the computing object 502a has an unknown output and, thus, is not redundant. In turn, the computing object 502b calls the computing object 502c, which is a third procedure ("third_procedure"). Thus, with respect to redundancy, the computing object 502b is analogous to the computing object 502a.

In certain instances, the computing objects 502a-502i may each have an associated status 504a-504i. That is, the status 504a may be associated with the computing object 502a, the status 504b may be associated with the computing object 502b, and so on. In some implementations, each of the statuses 504a-504i may be at least partially characterized by a ratio of the number of expressions for which a result is known without any external input to the number of total expressions in the respective one of the computing objects 502a-502i. Thus, for example, the status 504a may be expressed as "0/1" to reflect that the computing object 502a includes a single expression and it has an unknown result without any external input, or that it does not otherwise resolve to a known, predetermined result without further information. In instances in which it may be useful to present the tokenization of the computer code 500 on a graphical user interface (e.g., to facilitate assessment by a network administrator), the statuses 504a-504i may further or instead be expressed according to predetermined visual indicia (e.g., color-coding) to facilitate visualizing a pattern of redundancy across the computing objects 502a-502i.

The computing object 502c is a third procedure ("third_procedure") including code for downloading a file at a given Uniform Resource Locator (URL). The computing object 502c includes a series of expressions that build a Uniform Resource Locator (URL) string to download. While the underlying activity—retrieving remote content— may have legitimate purposes, the computing object 502c includes redundant expressions that are also probative of malicious intent. In general, the computing object 502c includes a combination of redundant and non-redundant expressions such that the status 504c of the computing object 502c is somewhere within a range between zero redundancy and complete redundancy. In this example, the URL string is split into multiple strings that are then appended together to form the full URL. This may be (and likely is) an obfuscation technique intended to avoid detection of the full URL in the computer code 500. As reflected in the status 504c, the expressions used to build the full URL evaluate to a specific, known result. At the same time, although the file intended to be downloaded from the full URL is likely malware in this example, the actual content of the file is unknown. Accordingly, the expressions associated with the step of downloading the file from the full URL are associated with an unknown result and, as such, are not categorized as redundant. The status 504c, therefore, is a ratio greater than zero and less than one. Specifically, the status 504c is represented as 59/63 in this case, which should be understood to mean that 59 out of the 63 expressions in the computing object 502c have a known result without any external input.

In another aspect, the nature of the code may be taken into account. For example, regardless of the degree of redundancy in the expressions, certain behaviors embodied in a code segment, such as statements that control program flow or the like, may be indicative of malicious intent, even if a particular expression is not redundant within that statement. For example, where several different resources or objects such as non-program memory on an endpoint, a remote network resource, and encrypted content are combined to form a URL, this may be considered suspicious even in instances in which there is little or no redundancy. Similarly, statements in the code may render the code redundant (e.g., by providing nonce conditional statements, loops, or other structure and/or flow control that obfuscates the purpose of code and adds execution complexity without changing a predetermined external code behavior). Thus, while redundancy in expressions contained within code can provide a useful metric for potential obfuscation, other types of redundancy, such as structural redundancy including various programming statements, may also or instead be employed. As such, while the foregoing description emphasizes the detection and analysis of redundancy in expressions evaluated during program execution, a code segment may contain other types of redundancy indicative of malicious intent, and all such types of redundancy that might be used to detect malware are intended to fall within the scope of this disclosure.

As an example of the foregoing, the computing object 502e is a procedure ("generate_download_complete_value") that always generates a value of four and does so in an inefficient manner That is, the computing object 502e includes expressions that call the computing objects 502f, 502g, 502h, and 502i in an order that produces a known result. In particular, the computing object 502f is a procedure ("multiply_by_zero") that multiplies a value by zero and, thus, always returns a value of zero. The computing object 502g is a procedure ("add_ten") that adds ten to the result of the computing object 502f and, therefore, returns a value of ten. The computing object 502h is a procedure ("divide_by_two") that divides the result of the computing object 502g by two, the result of which is always 5. Further, the computing object 502i is a procedure ("subtract_one") that subtracts one from the value of the computing object 502h and, therefore, always produces a value of four. The respective statuses 504e-504i for these computing objects 504e-504i reflect that each of the corresponding expressions are known without any external input and can, therefore, be categorized as redundant.

The computing object 502d is another example of complete redundancy. More specifically, the computing object 502d is a procedure ("generate_status_okay_value") that always returns the number 400 In this example, a value of a parameter ("x") is calculated to be 400, a loop increments a variable ("i") to a value of 401. The expression "DoEvents" does nothing, and the variable ("i") is decremented to a value of 400 through a conditional if statement. Because the output of the computing object 502d always produces a value of 400, the status 502d corresponding to the computing
object 502d indicates that all of the expressions of the computing
object 502d are known.

Having described tokenization of the computer code 500 into the computing objects 502a-502i and identification of redundancy in the computing objects 502a-502i, attention is now turned to determining whether the identified redundancy is consistent with obfuscation used in malware such as code created using server-side polymorphism. That is, even legitimate computer code may include some redundancy (e.g., as a result of aggregation of code from multiple sources or inefficient programming practices). Thus, identification of redundancy in the computer code 500 may not, in itself, be informative of whether the computer code 500 is likely to be malware. In certain implementations, therefore, it may be useful to assess one or more characteristics of the redundancy to facilitate identifying the computer code 500 as malware. For example, as described in greater detail below, a degree of redundancy may be particularly effective for discerning legitimate code from an obfuscated malware variant. Additionally, or alternatively, as also described in greater detail below, a pattern of redundancy may be useful for discerning legitimate code from an obfuscated malware variant. This may be the case, for example, in instances in which server-side polymorphism uses the same or similar patterns to form obfuscated malware variants.

Figure 5B:
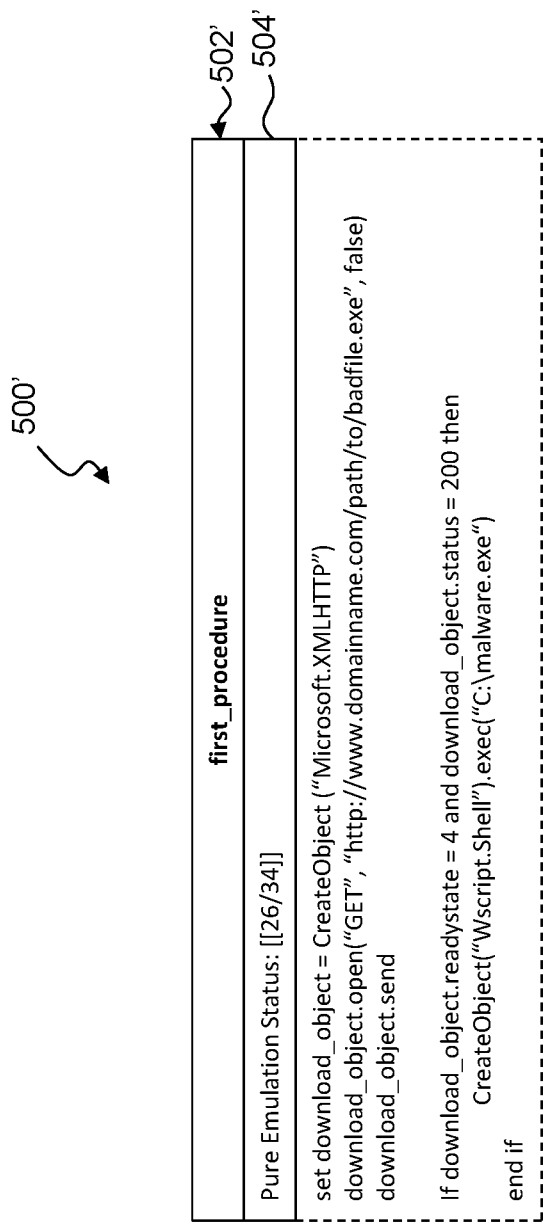
FIG. 5B is a schematic representation of a compressed version of the computer code of FIG. 5A.

FIG. 5B is a schematic representation of a compressed version 500' of the computer code 500 of FIG. 5A. As used in this context, compression of computer code should be generally understood to include any simplification of the computer code, such as through removal of redundant expressions, including without limitation redundant variables, redundant function calls, redundant conditional statements, redundant flow control, or any other redundant expressions, structures, statements, as well as combinations of the foregoing and/or any other redundant code that can be removed from a code segment without loss of functionality or change in behavior. For example, this may include removal of iterative or recursive loops, conditional statements, functional calls, or any other instructions or the like that resolve to a predetermined value or result. More generally, any instructions, routines, variables or the like that are not necessary or useful for code to achieve a result or output, or that may otherwise be omitted without loss of function of the executing code, or that do not otherwise affect program behavior or results, may be considered redundant as contemplated herein.

For example, as described in greater detail below, the compressed version 500' may have decreased redundancy, as compared to redundancy in the computer code 500, while maintaining functionality of the computer code 500 (FIG. 5A). That is, as compared to the computer code 500 (FIG. 5A), the compressed version 500' may have fewer expressions while producing the same output in response to a given input. In instances in which the computer code 500 (FIG. 5A) has little or no redundancy (e.g., redundancy below a threshold typically associated with legitimate software), the compressed version 500' may be identical or nearly identical to the computer code 500 (FIG. 5A). In these degenerate cases, however, obfuscation is not present and, therefore, the computer code 500 (FIG. 5A) may be screened for malware threats directly by using malware detection techniques, such as comparison to known malware variants (e.g., through string matching).

Referring now to FIGS. 5A and 5B, collectively, the compressed version 500' is formed through (1) merging the computing object 502b and the computing object 502c into the computing object 502a, (2) replacing the expressions associated with building the URL in the computing object 502c with the full URL, (3) replacing the status value procedures corresponding to the computing objects 502d-502i with the corresponding integer values (400 and 4), and (4) removing the loop and pointless procedures in the computing objects 502d-502i. With these changes, the compressed version 500' has the same functionality as the computer code 500 while using fewer expressions. In particular, the compressed version 500' includes a single instance of a computing object 502' having a status 504' indicating that 26 out of 34 expressions in the computing object 502' have a known result without any external input.

As used herein, a degree of redundancy should be understood to be based on a quantitative comparison of the computer code 500 and the compressed version 500' formed from the computer code 500. As an example, a degree of redundancy may be based on a number of expressions in a compressed version of computer code and a number of expressions in the computer code prior to compression. As a more specific example, a degree of redundancy may be expressed as a percentage as follows:

$$R(\%) = 100 \cdot \frac{N_{software\ code} - N_{compressed\ version}}{N_{software\ code}}$$

where R is the degree of redundancy, $N_{software\ code}$ is the number of expressions in the computer code, and $N_{compressed\ version}$ is the number of expressions in the compressed version. In the specific instance shown in FIGS. 5A and 5B, the number of expressions in the computer code 500 is 932, the number expressions in the compressed version 500' is 34 and, thus, the degree of redundancy is about 96 percent. It will also be understood that redundancy may be expressed using a variety of other quantitative scales having different ranges (e.g., 0-1 or 1-10), linear or otherwise, and that use various weights (e.g., by overweighting function calls that deterministically return a single value under all conditions) and the like to increase or decrease sensitivity to different types of measured redundancy. Any such measurements that can provide a consistent, objective measure of redundancy may be used as a redundancy measure in subsequent calculations, analyses, or combinations thereof, as contemplated herein.

In general, the degree of redundancy in legitimate code in certain programming languages can be below about 25 percent while the degree of redundancy in obfuscated malware variants is typically well above 90 percent. Given this large difference, the degree of redundancy may be a particularly useful parameter for accurately discerning (e.g., with a low likelihood of false positives) likely obfuscated malware variants from legitimate code. In the example represented in FIGS. 5A and 5B, the computer code 500 has a degree of redundancy that is highly indicative of an obfuscated malware variant. In such instances, as described in greater detail below, a remedial action may be initiated based on the high degree of redundancy in the computer code 500. For other types of programming languages, however, legitimate code may have higher degrees of redundancy for the purpose of obfuscating proprietary code. Thus, it should be appreciated that the thresholds used for legitimate and obfuscated code may be based on the programming language of the code being analyzed.

FIG. 6 is a flowchart of an exemplary method 600 for detecting malware. As described in greater detail below, the exemplary method 600 is based on the insight that redundancy is a salient characteristic of obfuscated malware variants formed through techniques such as server-side polymorphism. Accordingly, the exemplary method 600 can advantageously improve identification of malware or suspected malware even as large numbers of new variants of malware are formed. Unless otherwise indicated or made clear from the context, it should be understood that the exemplary method 600 may be carried out using any one or more of the various different aspects of threat management systems described herein. Thus, for example, any one or more of the endpoints described herein may have stored thereon an application on which computer code is executable. In certain instances, one or more aspects of the exemplary method 600 may be carried out by a security agent on the endpoint. Further, or instead, any one or more of the threat management facilities described herein may be in a communicating relationship with the endpoint and configured to carry out any one or more aspects of the exemplary method 600.

As shown in step 602, the exemplary method 600 may include receiving computer code including a code segment with one or more expressions executable by an endpoint (e.g., by evaluating the expressions within an application or other programming environment for the computer code). In general, the computer code may be received from any of various different sources that may be associated with propagation of malware and may be in communication with one or more endpoints. Thus, for example, the computer code may be received from a resource within the system (e.g., one or more of a plurality of endpoints) as the resource sends or attempts to send the computer code to another resource within the system. Further, or instead, the computer code may be received from one or more of various different external resources associated with dissemination of computer code to one or more endpoints of the system. Examples of such external resources may include one or more of a data network in communication with an endpoint of the system or an external data storage device (e.g., a universal serial bus (USB) drive) accessible from an endpoint of the system.

Unless otherwise indicated or made clear from the context, the computer code may be received at any one or more of various different portions of a system (e.g., the system 300 in FIG. 3), such as may be useful for timely analysis of the computer code. Thus, in some instances, the computer code may be received at a security agent on the endpoint. Further, or instead, the computer code may be received at a threat management facility, such as any one or more of the various threat management facilities described herein, which may be useful, for example, for a coordinated response to a malware attack.

Further, as used in this context, computer code, or a computer code segment or script language code forming such computer code, shall be understood to include any one or more of various different instructions for execution by an endpoint—alone or in combination with other endpoints— and which may be deliberately obfuscated to deliver malware or for other purposes inconsistent with legitimate or intended usage of network resources. Accordingly, the computer code may include a code segment containing a plurality of expressions executable by an application on the endpoint. The application may, for example include any of a variety of productivity tools such as a word processing application, a spreadsheet, a portable document application, a presentation application, or an electronic mail client. The code segment may also or instead include source code, compiled code, or interpretable code for other execution on the endpoint. In some implementations, the computer code may include scripting language code in a scripting language interpretable by an application executing on the endpoint. As used herein, script language code shall be understood to include a code segment containing a plurality of expressions for evaluation (e.g., by executing the code segment in a run-time environment on an endpoint). Examples of such script language code include, but are not limited to, Visual Basic for Applications (VBA) and JavaScript. Given that script language code is ubiquitous in many computing environments and, as such, is a common pathway for the dissemination of malware, application of the exemplary method 600 to script language code may be particularly useful for detecting malware or suspected malware. Additionally, or alternatively, computer code may include any one or more of list-based code, structured code, object-oriented code, and aspect-oriented code.

As shown in step 604, the exemplary method 600 may include characterizing redundancy in the computer code. As described above, the redundancy may be of a degree or nature characteristic of obfuscation—that is, characteristic of a deliberate attempt to conceal one or more aspects of the computer code. In some instances, redundancy that is characteristic of obfuscation may have a legitimate purpose, such as where a trusted software vendor uses obfuscation to prevent or discourage reverse engineering. In many instances, however, redundancy that is characteristic of obfuscation is associated with illegitimate purposes, such as the delivery of malware. For example, certain patterns of redundancy may be characteristic of polymorphism (e.g., server-side polymorphism) in which a large number of obfuscated malware variants are generated with the intent of eluding signature-based malware detection techniques or the like that operate by matching portions of a code segment to known malware variants. As a more specific example, obfuscation in a plurality of samples may share redundancy characteristics (e.g., degree of redundancy, pattern of redundancy, or a combination thereof) indicative of provenance from the same source, such as a server-side polymorphism engine.

In one aspect, characterization of redundancy may include analysis of a plurality of expressions in at least a portion of the received computer code to identify expressions for which all results are known without any external inputs. The results of such analysis may be, for example, aggregated to facilitate an assessment of computer code, or a code segment within a program or other larger code sample. For example, characterization of redundancy may include identification of a type of redundancy suggestive of malware. While this may include a pattern of redundancy including superfluous expressions, this may also or instead include other types of redundancy such as superfluous variables, superfluous statements, superfluous functions, superfluous conditional statements, superfluous structure, superfluous flow control and so forth. Superfluous code may generally take a wide variety of different forms within a code segment. For example, superfluous code may include a code segment that contains a conditional statement lacking a condition, or a code segment that contains one or more variables unnecessary for execution of the computer code.

In some implementations, it may be desirable to eliminate, or at least reduce, the likelihood of mischaracterizing the computer code as malware or suspected malware when the computer code is, in fact, legitimate code. This type of false-positive error may interfere, for example, with normal operation of the network and, further or instead, may create a substantial burden for network administrators. Accordingly, to reduce the likelihood of false positive identification of malware or suspected malware, the redundancy analysis may be confined to identifiable portions of a plurality of expressions, statements and the like. That is, portions of a code segment that are unidentifiable may be omitted from characterization of redundancy in the computer code. As used in this context, identifiable expressions should be understood to include those expressions for which an output is known in response to requisite external inputs (if any) and unidentifiable expressions should be understood to include those expressions for which an output is unknown in response to requisite external inputs (if any). Thus, for example, an expression that downloads a file or otherwise retrieves data from an external resource may be unidentifiable in instances in which the downloaded file is unknown. Further, or instead, the plurality of expressions may include one or more encrypted expressions (unidentifiable) and one or more unencrypted expressions (identifiable). Because the output of the one or more encrypted expressions is unknown (at least until a successful decryption), redundancy associated with these expressions may likewise be unknown. Accordingly, to reduce the likelihood of a false positive error in identifying malware or suspected malware in a code segment that contains encrypted expressions, it may be useful to omit the encrypted expressions from characterization of redundancy.

In instances in which a percentage of the plurality of expressions of the computer code include unidentifiable expressions, it may be useful to include this information in the characterization of redundancy. For example, the characterization of redundancy may be associated with a confidence level or weighting based on a percentage of the plurality of expressions of the computer code that are unidentifiable expressions that have been excluded from the characterization of redundancy. Such a weighting or confidence level may be useful for determining appropriate remedial action to be taken based on the characterization of redundancy, with lower confidence characterizations subjected to additional analysis in some cases.

In general, characterization of redundancy may be carried out according to any one or more of the various different techniques described herein for assessing redundancy, or any other method or combination of methods suitable for objectively characterizing the amount or type of redundancy within a code segment. Characterization of redundancy may include comparing the original computer code (prior to tokenization and/or compression) to a compressed version of the computer code, with the redundancy evaluated as a relative or absolute reduction within the compressed code of, for example, lines of code, instructions, variables, expressions, statements, subroutines, functions, constants, as well as any suitable combination of the foregoing. Thus, as a more specific example, redundancy may be characterized by tokenizing the plurality of expressions of the computer code into computing objects and compressing the computing objects into a compressed version of the computer code, and then objectively measuring a reduction in the number of expressions, or a reduction in a ratio of known to unknown expressions as contemplated herein. In certain implementations, the tokenized computing objects and the compressed computing objects may be displayed on a graphical user interface at a threat management facility to provide a network administrator with insight regarding the characterization of redundancy, or, further or instead, to provide the network administrator with an opportunity to review or override a malware detection based on redundancy.

In certain implementations, characterizing redundancy in the plurality of expressions of the computer code may include determining a degree of redundancy, as also described above with respect to FIGS. 5A and 5B, based on a comparison of the plurality of expressions in the computer code to a compressed version of the computer code. The degree of redundancy measured in this manner may provide a particularly useful, and readily determinable, metric for distinguishing human-generated redundancy in legitimate code from computer-generated redundancy—such as redundancy created in server-side polymorphism—in obfuscated malware variants. While characterizing redundancy in the plurality of expressions may be based on a degree of redundancy, it should be appreciated that other quantitative metrics may further or instead be used to characterize redundancy in the computer code. For example, an overall number of redundant expressions in the computer code may further, or instead, be useful for characterizing redundancy in the computer code. Additionally, or alternatively, while characterizing redundancy has been described as including quantitative metrics, characterizing redundancy may, further or instead, include qualitative assessments, such as determinations of patterns of redundancy, as described in greater detail below. Similarly, redundancy in other aspects of a code segment, such as superfluous variables, conditionals, loops and so forth, may also or instead be used to evaluate, objectively, redundancy, along with any other suitable code characteristics such as characteristics amenable to automated detection and/or objective analysis.

As shown in steps 606, 608, and 610, the exemplary method 600 may include, in response to characterizing the redundancy, conditionally initiating a remedial action with respect to the computer code. That is, in step 606, a determination may be made with respect to whether or not a remedial action is required. If a remedial action is not required, the code may be run in step 608 or, in certain instances, subjected to further analysis prior to being allowed to run on an endpoint. Further, or instead, if a remedial action is required, the remedial action may be carried out in step 610.

In certain implementations, the remedial action may include denying operation of the computer code by the endpoint or, in instances in which all or a portion of the exemplary method 600 is carried out away from an endpoint, denying delivery of the computer code to the endpoint. Thus, stated differently, conditionally initiating a remedial action with respect to the computer code may include permitting or denying execution of the computer code by the endpoint. As used in this context, permitting execution of the computer code by the endpoint may include running the computer code on the endpoint without further analysis or, in some cases, subjecting the original code or non-obfuscated (e.g., tokenized and/or compressed) computer code to other forms of malware detection before permitting the computer code to run on the endpoint.

While the remedial action carried out in step 610 may include a complete denial of execution of the computer code, other remedial actions may be applied to computer code suspected of being an obfuscated malware variant. As an example, the remedial action may include restricted execution of the computer code by the endpoint, with the amount and type of restriction based at least in part on the characterization of the redundancy. For example, the remedial action may include permitting the endpoint to execute the computer code while the endpoint has restricted access to certain network resources. More generally, unless otherwise indicated or made clear from the context, the remedial action may include any manner and form of remedial actions described herein and, thus, may include deployment of a sandbox or other techniques for gathering more information regarding the computer code.

In certain implementations, conditionally initiating a remedial action with respect to the computer code may include presenting an acceptance decision to an administrator through a user interface at a threat management facility. Thus, for example, the administrator may intervene with respect to whether or not to initiate a remedial action. Such intervention on the part of the administrator may include overriding a decision to initiate a remedial action, which may be useful for avoiding or reducing the likelihood of false positive identification of the computer code as malware. As a more specific example, the administrator may override the decision to initiate a remedial action when the administrator is confident of the provenance of the computer code at issue, such as may be the case when the computer code corresponds to the timing of a software update or other expected activity occurring within the network.

In implementations in which characterizing the redundancy includes determining a degree of redundancy, conditional initiation of a remedial action may be based on comparing the degree of redundancy to a predetermined threshold. As indicated above, the degree of redundancy appearing in non-obfuscated code is typically less than 25 percent while the degree of redundancy appearing in obfuscated code is typically greater than about 95 percent (e.g., greater than about 99 percent). Given this bimodal distribution, it should be appreciated that a predetermined threshold greater than about 25 percent and less than about 95 percent may be effective for distinguishing obfuscated malware variants from non-obfuscated code, which may be subject to further analysis (e.g., through matching techniques) to determine whether it is nevertheless a non-obfuscated variant of malware.

In some instances, the predetermined threshold for the degree of redundancy distinguishing obfuscated computer code from non-obfuscated computer code may be adjustable. For example, the predetermined threshold may be dynamically adjusted based on false positives. For example, an automated or semi-automated control loop may be implemented in which a high number of false positives causes an increase in the degree of redundancy required for a malware conviction, and a low number of false positives causes a decrease in the degree of redundancy required for a malware conviction. In this manner, the detection sensitivity may by continuously and dynamically adjusted according to the success of a particular redundancy metric in achieving accurate detections. Additionally, or alternatively, the predetermined threshold may be adjusted based on detecting an anomaly (e.g., unusual network traffic) in network activity. Further, or instead, the predetermined threshold may be adjustable by an administrator through a user interface at a threat management facility in communication with an endpoint on which the computer code is intended to execute. In another aspect, different redundancy metrics may be used in parallel, e.g., where different types of redundancy are known to be associated with different types of malware.

In certain implementations, conditionally initiating remedial action with respect to the computer code may be based on characterization of the redundancy in combination with one or more other factors, useful for providing context with respect to whether redundancy in the computer code is representative of a threat. For example, redundancy in computer code from a trusted source may be less likely to be considered representative of a threat than the same type and/or degree of redundancy in computer code from an unknown source. Additionally, or alternatively, the behavior of the computer code may provide useful context for assessing a threat posed by redundancy. That is, given that malware may rely on certain types of behavior (e.g., auto open behavior, access to a resource external to the endpoint, or a combination thereof) to carry out a threat, the presence or absence of these behaviors may provide a useful weighting factor for assessing whether redundancy is associated with an obfuscated variant of malware rather than an obfuscated variant of legitimate code. Thus, returning to an example in which characterizing redundancy is based on a degree of redundancy, a combination of at least one behavior of the computer code and the degree of redundancy may form a basis for permitting or denying execution of the computer code or otherwise conditionally initiating remedial action of the code.

While characterization of redundancy has been described with respect to degree and type of redundancy, other aspects of redundancy may further or instead be useful for assessing whether computer code represents a security risk. For example, as described in greater detail below, a pattern of redundancy may be used as a basis for detection or remediation of computer code. Further, or instead, the successful association of a pattern of redundancy with a type of malware may facilitate detection even as the literal content of code changes.

Figure 7:
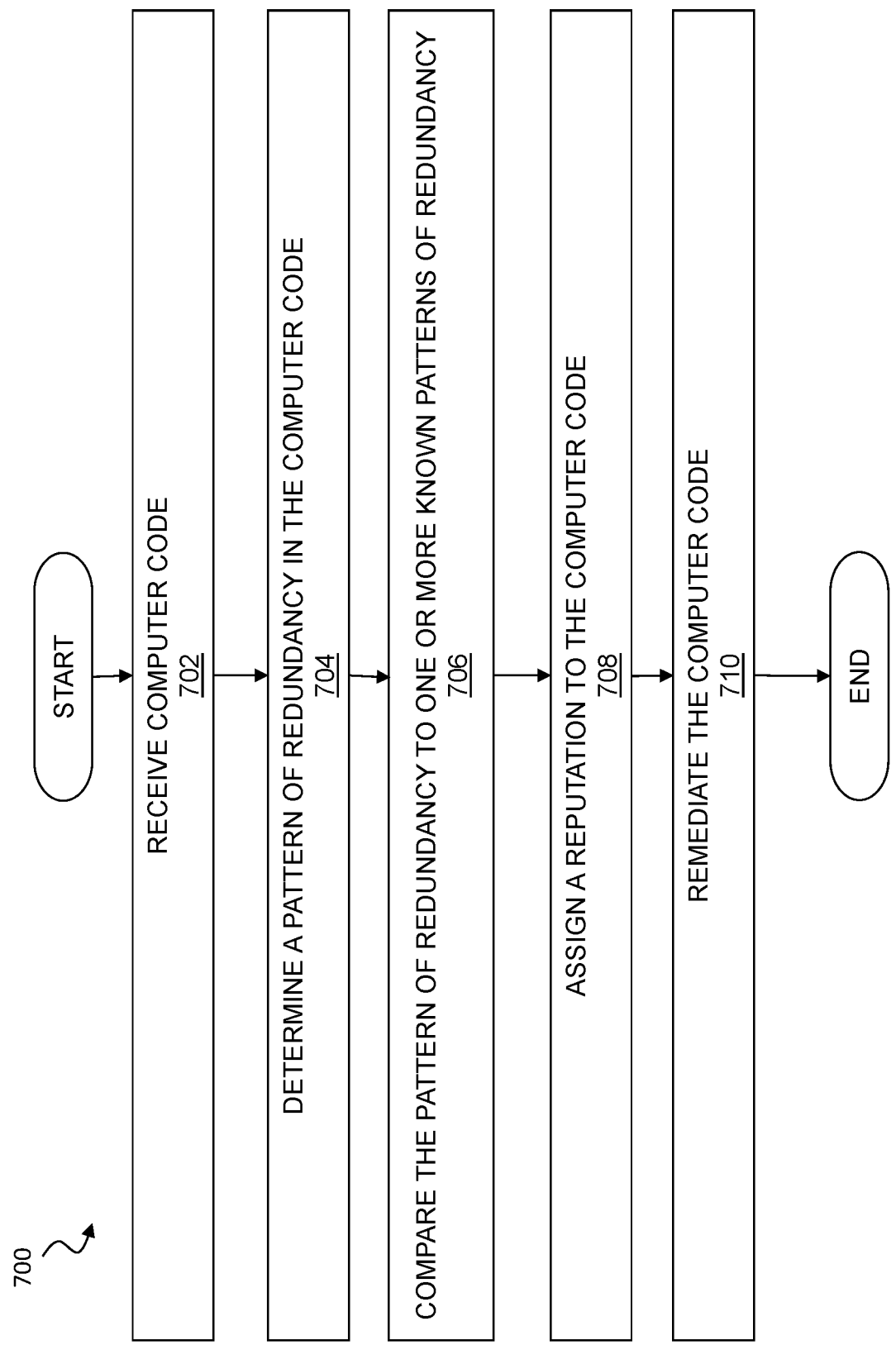
FIG. 7 is a flowchart of an exemplary method of evaluating computer code based on a pattern of redundancy.

FIG. 7 is a flowchart of an exemplary method 700 of evaluating computer code based on a pattern of redundancy. Unless otherwise indicated or made clear from the context, it should be understood that the exemplary method 700 may be carried out using any one or more of the various different aspects of threat management systems described herein. Thus, for example, any one or more of the endpoints described herein may have stored thereon an application (e.g., a word processing application, a spreadsheet, or any other application described herein) on which computer code is executable. In certain instances, one or more aspects of the exemplary method 700 may be carried out by a security agent executing on the endpoint. Further, or instead, an external threat management facility may be coupled in a communicating relationship with the endpoint and configured to carry out any one or more aspects of the exemplary method 700.

As shown in step 702, the exemplary method 700 may include receiving computer code that is executable on an endpoint (e.g., executable by an application on the endpoint). Unless otherwise specified or made clear from the context, receiving the computer code in step 702 should be understood to be analogous to receiving computer code in step 602 (FIG. 6). For example, the computer code may be any one or more of the various different types of computer code described herein and, thus, may include a code segment executable in a run-time environment on the endpoint and containing a plurality of statements and expressions. Further, or instead, the computer code may be received at the endpoint or at a threat management facility in communication with the endpoint.

As shown in step 704, the exemplary method 700 may include determining a pattern of redundancy in the computer code. While malware content may change frequently (e.g., in an attempt to elude detection, to deploy new threats, or a combination thereof), there is often little or no change to subroutine structure as new malware variants are deployed. Based on this insight, a pattern of redundancy may remain a useful identifier for malware, even as content of the malware is changed.

In general, the pattern of redundancy in the computer code may be determined based on any one or more of the various different approaches to identifying redundancy described herein. Thus, for example, determining the pattern of redundancy in the computer code may include tokenizing the plurality of expressions into computing objects and, further or instead, compressing the computing objects to reduce redundancy in the computing objects while maintaining functionality of the computer code, such as described above with respect to FIGS. 5A and 5B.

The pattern of redundancy may include any one or more of various different qualitative assessments of superfluous features of the computer code. Such qualitative assessments may include, but are not limited to, identification of relationships between redundant portions within the code, relationships between redundant portions of the code with calls to external resources, relationships between redundant portions of the code and encrypted portions of the code, or combinations thereof. Thus, for example, determining a pattern of redundancy may include identifying, in the computer code, one or more subroutines for which all results (e.g., for evaluation of expressions, etc.) are known without external input. In some instances, such identification of subroutines may include identification of relationships of subroutines to one another (e.g., subroutines that call one another, subroutines that are split up, or a combination thereof). Still further or instead, the pattern of redundancy in the computer code may correspond to a conditional statement lacking a condition, one or more variables unnecessary for execution of the computer code, or a combination thereof. In instances in which the computer code includes both identifiable portions and unidentifiable portions (e.g., encrypted portions and unencrypted portions, or local data and external pointers to remote resources), the pattern of redundancy may be based on the identifiable portions only. However, one or more relationships between encrypted portions and unencrypted, but redundant, portions may also or instead form a basis for determining the pattern of redundancy.

As shown in step 706, the exemplary method may include comparing the pattern of redundancy to one or more known patterns of redundancy. As used in this context, the one or more known patterns of redundancy may be one or more of globally known patterns (e.g., as provided from a third-party vendor) or locally known patterns detected and/or identified locally within an enterprise network or the like. In certain implementations, the one or more known patterns of redundancy may be, for example, known patterns associated with known malware. This may be useful for, among other things, identifying the computer code as potentially being associated with a particular source of malware. In some implementations, the one or more known patterns of redundancy may be known patterns associated with previously identified instances of obfuscated computer code identified as being directed to one or more endpoints in the network. This may be useful, for instance, for informing the efficient use of resources for remedial action to be taken on the computer code. As a specific example, in an instance in which a previously identified instance of obfuscated computer code required the use of a hardware sandbox, the identification of a similar pattern in the computer code may be used as a basis to forego analysis using one or more virtual sandboxes and proceed directly to the use of the hardware sandbox. As this example demonstrates, such a use of the pattern of redundancy may be useful for reducing the time, resources, or a combination thereof used to analyze the computer code for a malicious threat.

As shown in step 708, the exemplary method 700 may include assigning a reputation to the computer code based on similarity between the pattern of redundancy observed in a code sample and the one or more known patterns of redundancy. In this context, similarity may include any manner and form of qualitative, quasi-qualitative, or quantitative comparison between patterns. For example, similarity may be based on a degree of matching between an overall pattern of the code and an overall pattern of the one or more known patterns. Further, or instead, similarity may be based on matching one or more salient features of the pattern of the code and comparable salient features of the one or more known patterns using, for example, feature vectors, fuzzy matching, or any other suitable technique(s) for objectively assessing similarity. For example, a salient feature used for comparison might include the manner in which redundancy is distributed among subroutines within a code segment, the names given to variables, the arrangement or frequency of conditional statements, or other identifiable characteristics.

The reputation assigned to the computer code may include any one or more of the various different reputation assignment techniques described herein. Thus, for example, assigning a reputation to the computer code may include color-coding the computer code. Further, or instead, patterns more likely to be associated with malware may be assigned a lower reputation than patterns that are less likely to be associated with malware.

As shown in step 710, the exemplary method 700 may include remediating the computer code based on the reputation. In general, such remediation may include any one or more of the remedial actions described herein. Further or instead, in instances in which the computer code is associated with a good reputation, the computer code may be allowed to run on the endpoint or subjected to analysis related to other types of threats.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for detecting malware, the computer program product comprising computer executable code embodied in a non-transitory computer readable medium that, when executing on one or more computing devices, performs the steps of:
receiving a script language code at a threat management facility in communication with an endpoint, the script language code including a plurality of expressions processable by an application in a run-time environment on the endpoint, wherein the plurality of expressions excludes at least one unidentifiable expression for which an output is unknown in response to requisite external inputs;

tokenizing the plurality of expressions of the script language code into computing objects;

compressing the computing objects into a compressed script in which redundancy is decreased relative to the script language code by removing one or more expressions from the script language code while maintaining functionality of the script language code, wherein removing one or more expressions includes appending multiple values in the script language code to build a string;

determining a degree of redundancy in the script language code based on a quantitative difference in a number of expressions evaluated in the script language code between an original version and a compressed version containing the compressed script; and conditionally initiating a remedial action responsive to the script language code when the degree of redundancy exceeds a predetermined threshold.

2. The computer program product of claim 1, wherein the script language code includes at least one of Visual Basic for Applications (VBA) or JavaScript.

3. The computer program product of claim 1, wherein the difference between the script language code and the compressed script is characteristic of polymorphism.

4. The computer program product of claim 1, wherein the difference between the script language code and the compressed script is characteristic of obfuscation.

5. A method of detecting malware, the method comprising:

receiving computer code, the computer code including a segment of a script language code executable by an endpoint;

characterizing redundancy in the segment based on a quantitative difference in a number of expressions evaluated in the script language code between an original version and a compressed version of the computer code in which one or more expressions from the original version of the computer code is removed while maintaining functionality of the original computer code, wherein removing one or more expressions includes appending multiple values in the script language code to build a string and, wherein the one or more expressions excludes at least one unidentifiable expression for which an output is unknown in response to requisite external inputs; and in response to characterizing the redundancy, permitting or denying execution of the computer code by the endpoint.

6. The method of claim 5, wherein the redundancy includes at least one of superfluous variables, superfluous function calls, superfluous structure, or superfluous flow control.

7. The method of claim 5, wherein the compressed version of the computer code has decreased redundancy, as compared to the original version of the computer code, while maintaining functionality of the original version of the computer code.

8. The method of claim 5, wherein the computer code includes a scripting language interpretable by an application executing on the endpoint.

9. The method of claim 5, wherein the computer code includes at least one of list-based code, structured code, object-oriented code, and aspect-oriented code.

10. The method of claim 5, wherein characterizing redundancy in the segment includes identifying one or more subroutines in the segment for which all results are known without external input.

11. The computer program product of claim 1, wherein the plurality of expressions includes expressions in the script language code for which an output is known in response to requisite external inputs.

12. The computer program product of claim 1, wherein the at least one unidentifiable expression includes at least one encrypted expression.

13. The computer program product of claim 1, wherein the at least one unidentifiable expression includes at least one expression referencing a data from an external resource.

14. The computer program product of claim 1, wherein the code further performs the step of conditionally initiating a second remedial action based on a pattern of redundancy including superfluous features in the script language code.

15. The computer program product of claim 14, wherein the pattern includes one or more of superfluous variables, superfluous statements, superfluous functions, superfluous conditional statements, superfluous structure, and superfluous flow control.

16. The method of claim 5, wherein the number of expressions includes expressions in the script language code for which an output is known in response to requisite external inputs.

17. The method of claim 5, wherein the at least one unidentifiable expression includes at least one encrypted expression.

18. The method of claim 5, wherein the at least one unidentifiable expression includes at least one expression referencing a data from an external resource.

* * * * *